US008190080B2

(12) United States Patent
Huang

(10) Patent No.: US 8,190,080 B2
(45) Date of Patent: May 29, 2012

(54) METHOD AND SYSTEM FOR MANAGING SKILLS ASSESSMENT

(75) Inventor: Lucas K. Huang, Columbia, MD (US)

(73) Assignee: Atellis, Inc., Washington, DC (US)

( * ) Notice: Subject to any disclaimer, the term of this patent is extended or adjusted under 35 U.S.C. 154(b) by 2077 days.

(21) Appl. No.: 10/787,597

(22) Filed: Feb. 25, 2004

(65) Prior Publication Data

US 2005/0186549 A1 Aug. 25, 2005

(51) Int. Cl.
*G09B 3/00* (2006.01)
(52) U.S. Cl. ........ 434/350; 434/118; 434/262; 434/322; 434/323
(58) Field of Classification Search .................. 463/118, 463/262, 322, 323, 350; 434/118, 262, 322, 434/323, 350
See application file for complete search history.

(56) References Cited

U.S. PATENT DOCUMENTS

| | | | | |
|---|---|---|---|---|
| 5,195,033 | A * | 3/1993 | Samph et al. | 434/323 |
| 5,204,813 | A * | 4/1993 | Samph et al. | 434/362 |
| 5,513,994 | A * | 5/1996 | Kershaw et al. | 434/350 |
| 5,565,316 | A * | 10/1996 | Kershaw et al. | 434/322 |
| 5,827,070 | A * | 10/1998 | Kershaw et al. | 434/322 |
| 5,915,973 | A * | 6/1999 | Hoehn-Saric et al. | 434/350 |
| 5,947,747 | A | 9/1999 | Walker et al. | |
| 6,546,230 | B1 * | 4/2003 | Allison | 434/350 |
| 6,589,055 | B2 | 7/2003 | Osborne et al. | |
| 6,616,453 | B2 * | 9/2003 | Kouba et al. | 434/219 |
| 6,739,877 | B2 * | 5/2004 | Bailey et al. | 434/262 |
| 6,918,771 | B2 * | 7/2005 | Arington et al. | 434/262 |
| 7,011,528 | B2 * | 3/2006 | Tweet et al. | 434/262 |
| 7,088,949 | B2 | 8/2006 | Burstein et al. | |
| 2003/0031993 | A1 * | 2/2003 | Pugh | 434/262 |
| 2004/0106088 | A1 * | 6/2004 | Driscoll et al. | 434/118 |
| 2006/0286540 | A1 * | 12/2006 | Burstein et al. | 434/353 |

FOREIGN PATENT DOCUMENTS

JP 2001324918 A 11/2001

OTHER PUBLICATIONS

Gabriel, Barbara, Replicating the 'Real Thing': How Virtual Reality is Transforming Medical Education, Sep. 2001, AAMC Reporter.*
The Burning (Seinfeld) [online], [retrieved on Nov. 16, 2009]. Retrieved from the Internet <URL: http://en.wikipedia.org/wiki/The_Burning_(Seinfeld)>.*
Simulated Patient [online], [retrieved on Nov. 19, 2009]. Retrieved from the Internet <URL: http://en.wikipedia.org/wiki/Simulated_patient>.*
Motofumi Yoshida, Learning and Assessment in Basic Clinical Skills, Advances in Medicine, Ltd., May 24, 2003, pp. 489-491, vol. 205, No. 8, Ishiyaku Press Co. Ltd.

* cited by examiner

*Primary Examiner* — Xuan Thai
*Assistant Examiner* — Kang Hu
(74) *Attorney, Agent, or Firm* — Sughrue Mion, PLLC

(57) ABSTRACT

The present invention is directed to a method and skills assessment tool for managing a testing session in a clinical skills testing center comprising a plurality of assessment stations. The method according to the preferred embodiment of the present invention includes configuring the plurality of assessment stations by associating each of the stations with a case type prior to the beginning of the testing session, receiving electronic identification of a student at one of a plurality of assessment stations prior to the student commencing an encounter at the one assessment station during the testing session, and, in response to receiving the student's identification, automatically assigning the student to the one assessment station for the encounter, where the encounter corresponds with the case type associated with the one assessment station.

34 Claims, 10 Drawing Sheets

| PA II 2003 - Ches(Pain=Patricia Buckman | |
|---|---|
| Mean | 74.16% |
| Standard Deviation | 11.05 |
| Jennifer Billington | 54.05% |
| Darcy Richardson | 59.46% |
| Kevin DeGraff | 60.81% |
| Sarah Collins | 60.81% |
| Jasmine Lu | 62.16% |
| Rosa Evans | 63.51% |
| Anthony Wright | 64.86% |
| Tiffany Charleson | 66.22% |
| Myron Dafoe | 66.22% |
| Shawna Davenport | 68.92% |
| Keith Furnia | 68.92% |
| Heather Tuckman | 68.92% |

FIG. 7A

| Jennifer Billington | PBE III 2003 Abdominal Pain Carla Green | PBE III 2003 Chest Pain Patricia Buckman | PBE III 2003 Headache Maria Caputto | PBE III 2003 Panic Andrew Thompson |
|---|---|---|---|---|
| Written Exam | 52/180 = 28.89% | 150/180 = 83.33% | 87/180 = 48.33% | 80/240 = 28.89% |
| History | 6/9 = 66.67% | 6/8 = 75.0% | 5/13 = 38.46 | 5/9 = 55.56% |
| Communication | 25/55 = 45.45% | 26/55 = 47.27% | 40/55 = 72.73% | 39/55 = 70.91% |
| Physical | 4/6 = 66.67% | 4/7 = 57.14% | 4/6 = 66.67% | 3/5 = 60.00% |
| Case Total | 87/250 = 34.80% | 186/250 = 74.40% | 136/254 = 53.54% | 127/309 = 41.10% |
| Class Mean | 64.87% | 76.03% | 54.13% | 55.15% |
| Class Standard Dev. | 10.67% | 24.03% | 13.86% | 16.89% |

FIG. 7B

METHOD AND SYSTEM FOR MANAGING SKILLS ASSESSMENT

FIELD OF THE INVENTION

The present invention relates to skills assessment, and more particularly, to an automated system for managing a skills assessment center.

BACKGROUND OF THE INVENTION

An integral part of medical training involves exposing students to hypothetical situations where they are expected to diagnose and treat patients. In such training sessions, actors, known as standard patients ("SPs"), are trained to exhibit certain "symptoms" and to respond appropriately to questions. A student is required to examine the SP within a certain time period, e.g., a 15 minute appointment, attempt to diagnose the SP's ailment and to propose a planned treatment. Through such a process, a student's clinical skills and "bed side manner" are assessed.

Typically, clinical skills testing is conducted in an office setting where each office is set up as an examination room with an SP suffering from an ailment. Each examination room is equipped with monitoring equipment, including audio, visual and time recording devices, so that the student's encounter with the SP can be monitored in real time by an evaluator, such as a teaching assistant or upper classperson, and preserved for evaluation at a later time by a faculty member. The monitoring equipment is typically controlled by an administrator in a central control center or by a technician in each room. When the student is ready to begin the examination of the SP, the administrator or technician begin recording and timing the encounter.

Typically, a testing session requires a student to examine separately several SP's in approximately 30-40 minute time slots. After each encounter with an SP, the student is required to complete a post encounter assessment that is specific to the SP's ailment or case. The post encounter assessment can include a multiple choice checklist, subjective/objective assessment plan ("SOAP") notes, essay questions, or any combination thereof. In addition, the SP and, optionally, the evaluator also complete a post encounter assessment of the student, which can include a checklist specific to the case. Once the student and SP have completed their respective assessments, the student moves on to the next room on his or her schedule to examine another SP.

At the conclusion of the testing session, the post encounter assessments are collected and graded. The checklists, e.g., multiple choice exams, are objective and relatively easy to grade because they only require comparing the selected answer with a correct answer. Untrained personnel or a computer system can perform this task easily. Essay type answers are transmitted or forwarded to a skilled reviewer, typically a faculty member, for his or her evaluation and grading. Once the post encounter assessments have been graded, the results are communicated to the student.

While the above described testing process seems rather straightforward, logistically, it presents many challenges. For instance, prior to a testing session, the administrator must configure each examination room and schedule students, SPs and in some circumstances evaluators. In configuring one examination room for a testing session on a particular date, the administrator must select a case (ailment), schedule an SP trained to present that case, and for each 30 minute time slot in the testing session, schedule a student to be tested. The administrator must do this for each of the examination rooms, for each SP, and for each of the students to ensure that each student is scheduled to complete the rotation for the testing session. If the clinical office has 10 examination rooms, 20-60 SPs, and 100-170 students in a testing session, one can easily understand how this configuration process is excessively time consuming and labor intense. Changes to the configuration, e.g., if a student is unavailable to be tested on a particular date and must be rescheduled, are equally time consuming.

Moreover, the challenges do not cease at the preparation stage. During the testing session, the administrator (including his or her staff) must ensure that the proper pre and post encounter assessments are administered to the students and that each of the encounters is timed and recorded appropriately. The administrator must also collect the post encounter assessments and reset each of the examination rooms after each encounter so that the room is ready for the next student. Finally, the administrator must be sure that the students who appear for a test are those scheduled to be tested and that a student who enters a particular examination room at a particular time is in fact the student scheduled to be tested in that room and in that time slot. For example, if a student inadvertently enters an examination room for which that student has not been scheduled, then the post encounter assessments completed by that student could be mistakenly associated with another student. In addition, the student's mistake can cause other students to enter examination rooms to which they are not scheduled. In this situation, the administrator can easily lose track of the students' identities, which then compromises the testing session.

Finally, in the grading process, grading of the essay answers requires a faculty member to read, evaluate and grade a student's answer. This is not only difficult and time consuming, but also highly subjective, i.e., based on the reviewer's personal opinion. Thus, if more than one faculty member is grading student answers, the grades issued by one faculty member may not be comparable to those issued by another faculty member. If this is the case, the grade scores must be normalized, thereby adding yet another step to the grading process.

To alleviate some of these problems, electronic systems have been utilized to automate some of the tasks performed manually by the administrator and his or her staff. For example, the administrator can configure an examination room electronically by selecting a case and selecting the proper post encounter assessments via a computer terminal. Nevertheless, those systems still require the administrator to enter the name of a student for a particular time slot in a particular room for a particular testing session. Therefore, the task of scheduling or rescheduling SPs, students and optionally, evaluators, for a testing session remains unduly burdensome. In addition, none of the existing systems address the subjective nature of grading essay answers.

Accordingly, a need exists for a system and method for automatically managing a skills assessment center. The system should allow the administrator to configure rooms quickly and easily, and should also provide flexibility in assigning students to rooms for testing. The system should be easy to use and to implement. The present invention addresses such a need.

SUMMARY OF THE INVENTION

The present invention is directed to a method and skills assessment tool for automatically managing a testing session in a clinical skills testing center that includes a plurality of assessment stations. The method according to the preferred embodiment of the present invention includes configuring the plurality of assessment stations by associating each of the stations with a case type prior to the beginning of the testing session, receiving electronic identification of a student at one of a plurality of assessment stations prior to the student commencing an encounter at the one assessment station during the testing session, and, in response to receiving the student's identification, automatically assigning the student to the one assessment station for the encounter, where the encounter corresponds with the case type associated with the one assessment station.

Through the aspects of the present invention, the student is assigned to a particular assessment station at the time of the encounter in response to the student being electronically identified at the assessment station, by logging in, for example. In other words, the student is assigned to the assessment station in real-time, as opposed to before the testing session. By allowing the assignment to take place in real-time, the entire scheduling process is simplified and changes require little or no effort or involvement by the administrator.

BRIEF DESCRIPTION OF THE DRAWINGS

FIGS. 7A and 7B are diagrams illustrating sample grade reports.

DETAILED DESCRIPTION

The present invention relates to skills assessment and more particularly to an automated system for managing a skills assessment center. The following description is presented to enable one of ordinary skill in the art to make and use the invention and is provided in the context of a patent application and its requirements. While the preferred embodiment is related to a clinical skills testing center for medical students, various modifications to the preferred embodiment and the generic principles and features described herein will be readily apparent to those skilled in the art. For example, the present invention can be implemented in testing centers for auto mechanics or law students. Thus, the present invention is not intended to be limited to the embodiment shown but is to be accorded the widest scope consistent with the principles and features described herein.

Figure 1:
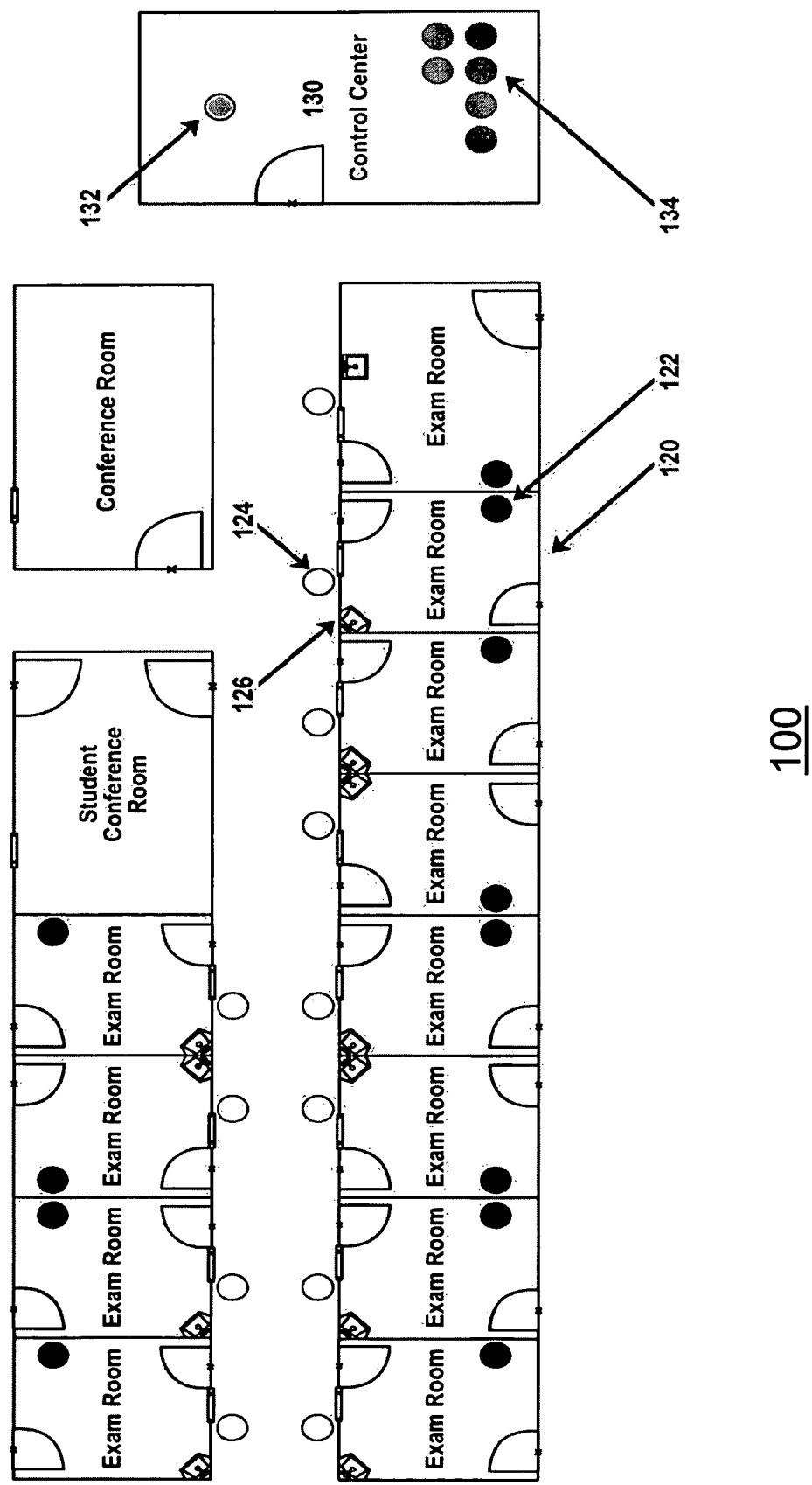
FIG. 1 illustrates a layout of skills assessment center according to a preferred embodiment of the present invention.

FIG. 1 is a diagram depicting a layout of a skills assessment center 100 according to a preferred embodiment of the present invention. In the preferred embodiment, the skills assessment center 100 is a clinical skills center for testing medical students. As is shown, the center 100 includes a plurality of assessment stations or examination rooms 120 and a control center 130. The control center 130 can be located physically in the same facility as the examination rooms 120, or can be located in a remote site. Each examination room 120 includes an input device 122 for the SP, and an input device 124 for the student. Each input device 122, 124 is preferably a data processing system, such as a personal computer, laptop, PDA, or the like. The examination room 120 also includes monitoring equipment 126, e.g., a camera for recording visual and audio data and a timer. The control center 130 includes a central controller 132, where an administrator (not shown) can manage the center 100, and a plurality of monitoring stations 134, where evaluators (not shown) can observe the students during a testing session. The central control controller 132 and each monitoring station 134 preferably is a data processing system, such as a workstation or personal computer.

Figure 2:
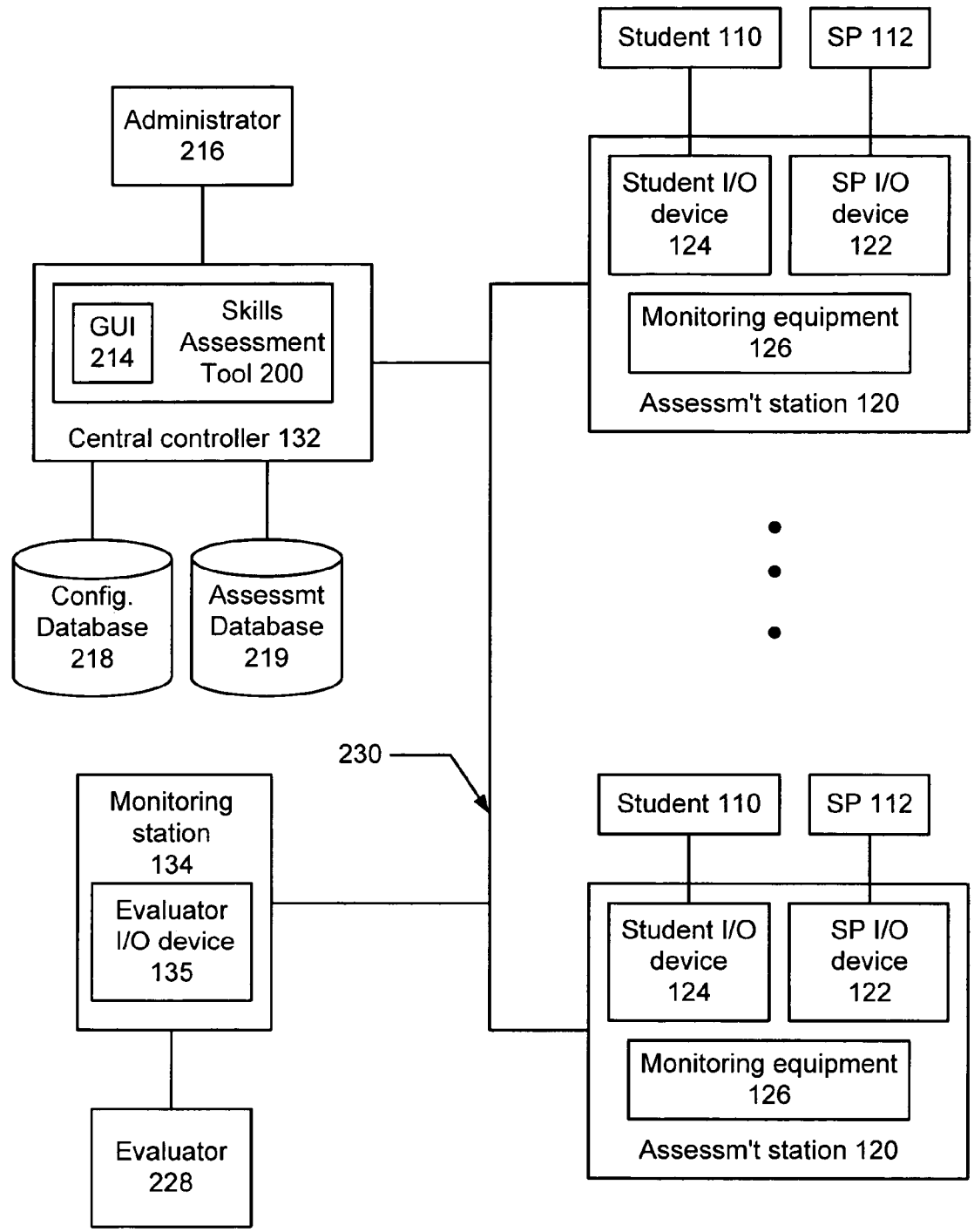
FIG. 2 is a block diagram illustrating in more detail the skills assessment center in accordance with the present invention.

FIG. 2 is a block diagram illustrating in more detail the skills assessment center, where like components from FIG. 1 are designated by like reference numerals. As is shown, the central controller 132 is in communication with the plurality of examination rooms or assessment stations 120 preferably via a wired or wireless network 230, such as a LAN, WAN, Intranet, or Internet. The central controller 132 is coupled to at least one data storage device for storing a configuration database 218 and an assessment database 219. In a preferred embodiment, the configuration database 218 stores information particular to test scenarios, e.g., types of cases, corresponding checklists, etc. The assessment database 219 includes student information and data collected during an examination, e.g., information particular to a student 110, the student's evaluations and test scores, digital assets associated with a student 110, etc.

As indicated above, each assessment station 120 includes a student input/output device 124, an SP input/output device 122 and monitoring equipment 126. In addition to traditional devices such as cameras, microphones and timers, the monitoring equipment 126 can also include sensor devices coupled to medical diagnostic instruments (not shown), such as an EKG, or stethoscope. Accordingly, data detected by the sensor devices, e.g., an irregular heartbeat amplified by a stethoscope, can be recorded and used to verify that a student 110 actually observed such a symptom.

For the sake of simplicity, one of the plurality of a monitoring stations 134 is shown coupled to the assessment stations 120 via the network 230. As stated above, the monitoring station 134 allows an evaluator 228 to observe, in real time, the information collected by the monitoring equipment 126 in each station 120 during a testing session. The monitoring station 134 also includes an evaluator input/output device 135 which allows the evaluator 228 to transmit and receive information to and from the central controller 132 and assessment stations 120.

In the preferred embodiment, the central controller 132 executes a skills assessment tool 200 that allows an administrator 216 to manage the assessment center. The skills assessment tool 200 is a preferably implemented as a software application that allows the administrator 216 to set up and run a testing session via a graphical user interface (GUI) 214.

Figure 2A:
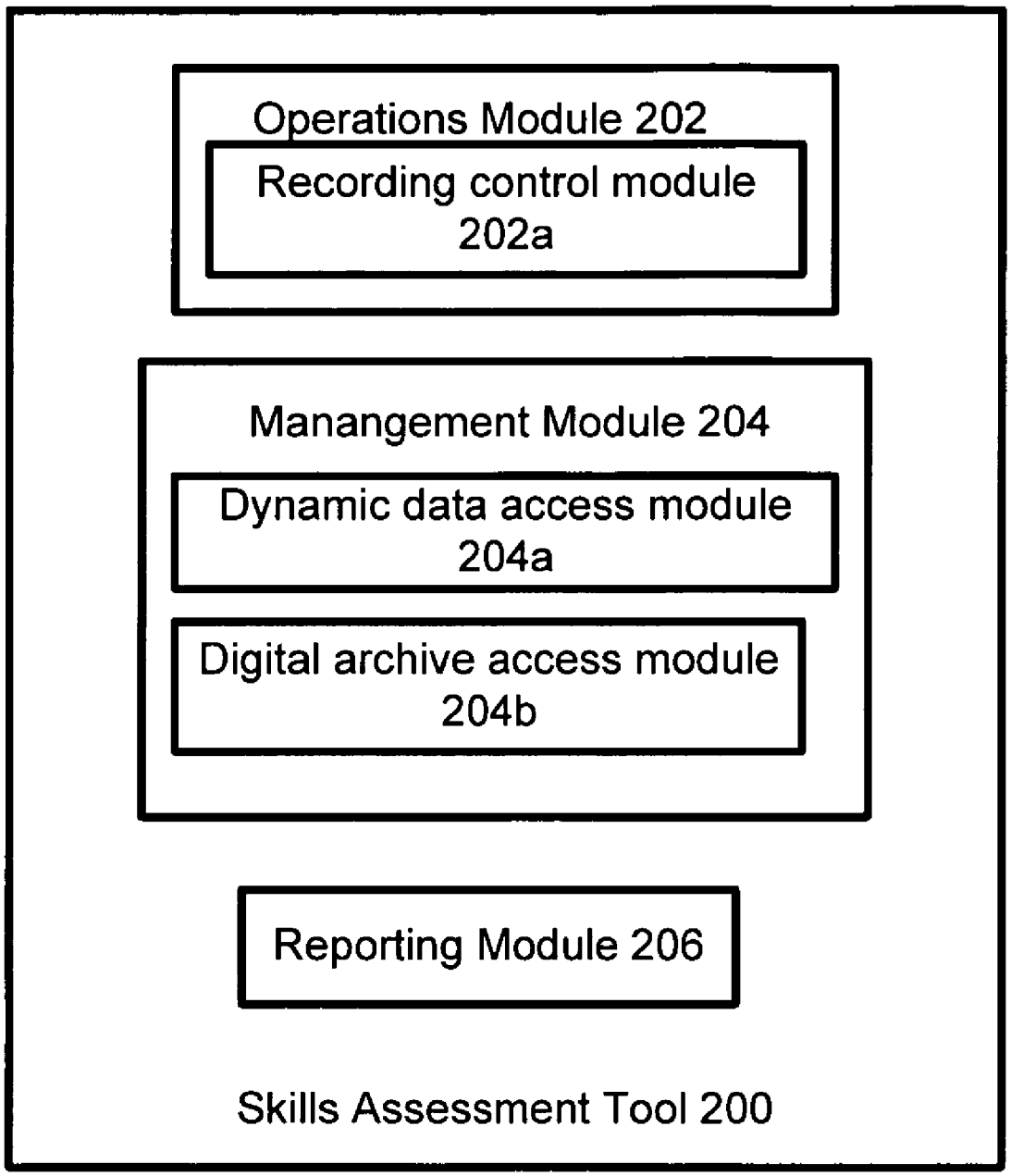
FIG. 2A is a block diagram illustrating the skills assessment tool in more detail according to a preferred embodiment of the present invention.

FIG. 2A is a block diagram illustrating the skills assessment tool 200 in more detail according to a preferred embodiment of the present invention. The tool 200 includes an operations module 202, a management module 204 and a reporting module 206. The operations module 202 primarily manages operations during a testing session and the management module 204 primarily manages station configuration. The reporting module 206 generally controls post-testing session functionality.

In accordance with the present invention, the modules 202-206 in the tool 200 allow the administrator 216 to configure each of the assessment stations 120 prior to a testing session or on-the-fly. During a testing session, when a student 110 logs in at a station 120 and is identified by the tool 200, the tool 200 automatically assigns the student 110 to the assessment station 120. The skills assessment tool 200 controls the monitoring equipment 126, administers post encounter assessments for the student 110, SP 112 and evaluator 228 via their respective input/output devices 122, 124, 135, and collects and grades the various assessments. The skills assessment tool 200 and the functionality of the modules 202-206 are described in more detail below.

Pre-Testing Session Configuration

Figure 3:
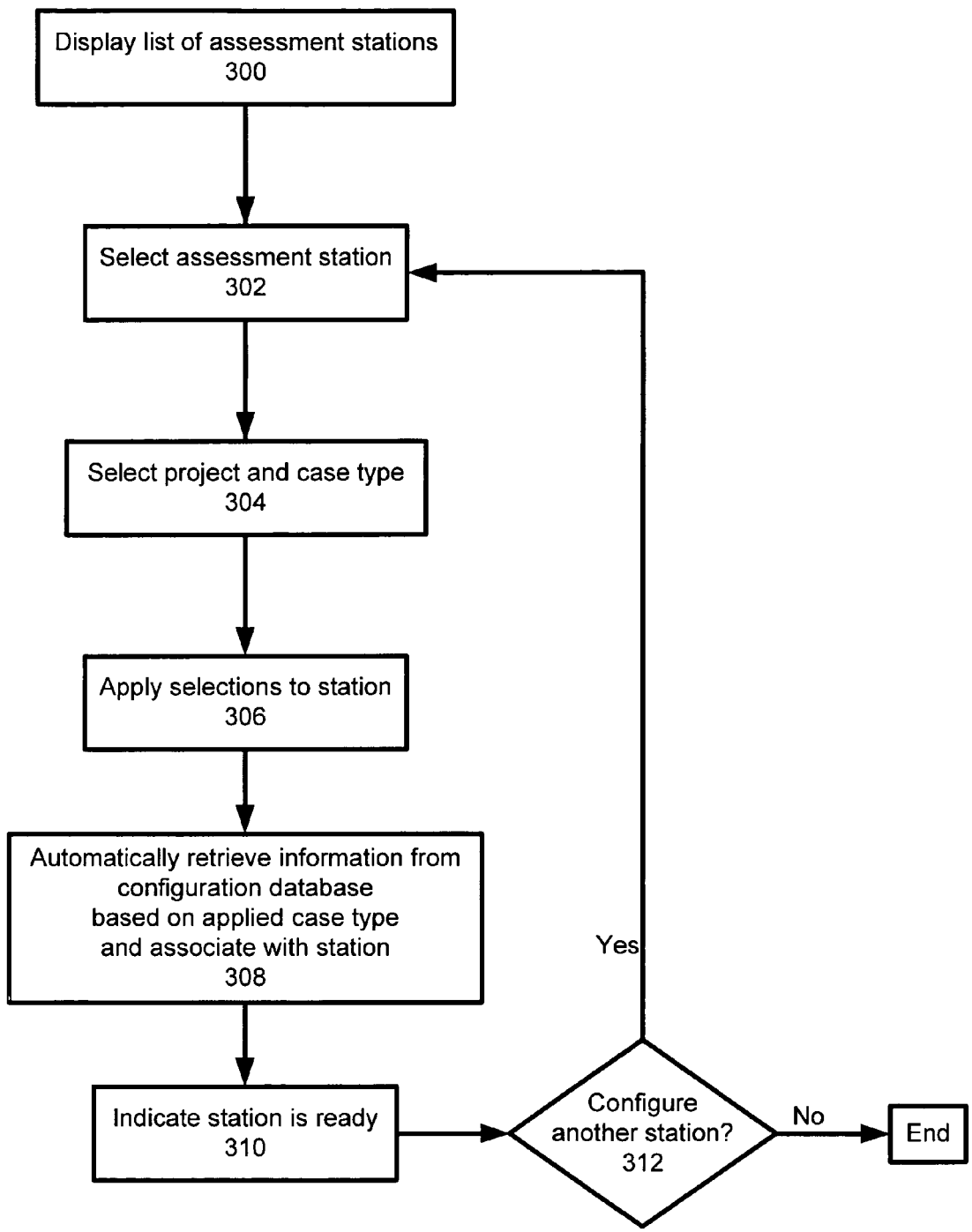
FIG. 3 is a flowchart illustrating a process for configuring a clinical testing center for a testing session according to a preferred embodiment of the present invention.

As stated above, the skills assessment tool 200 allows the administrator 216 to configure each assessment station 120 prior to a testing session or on-the-fly. FIG. 3 is a flowchart illustrating a process for configuring a clinical testing center for a testing session according to a preferred embodiment of the present invention. Referring to FIGS. 2, 2A and 3, the configuration process begins when the administrator 216 selects a configuration mode via the GUI 214 (FIG. 2) and the operations module 202 (FIG. 2A) displays a window that depicts the layout of the assessment stations 120, such as that illustrated in FIG. 1 (step 300). In a preferred embodiment, each assessment station 120 is identified, e.g., by a number, and in step 302, the administrator 216 selects an assessment station 120 by, clicking on the selected station 120 with a mouse, for example.

Figure 4:
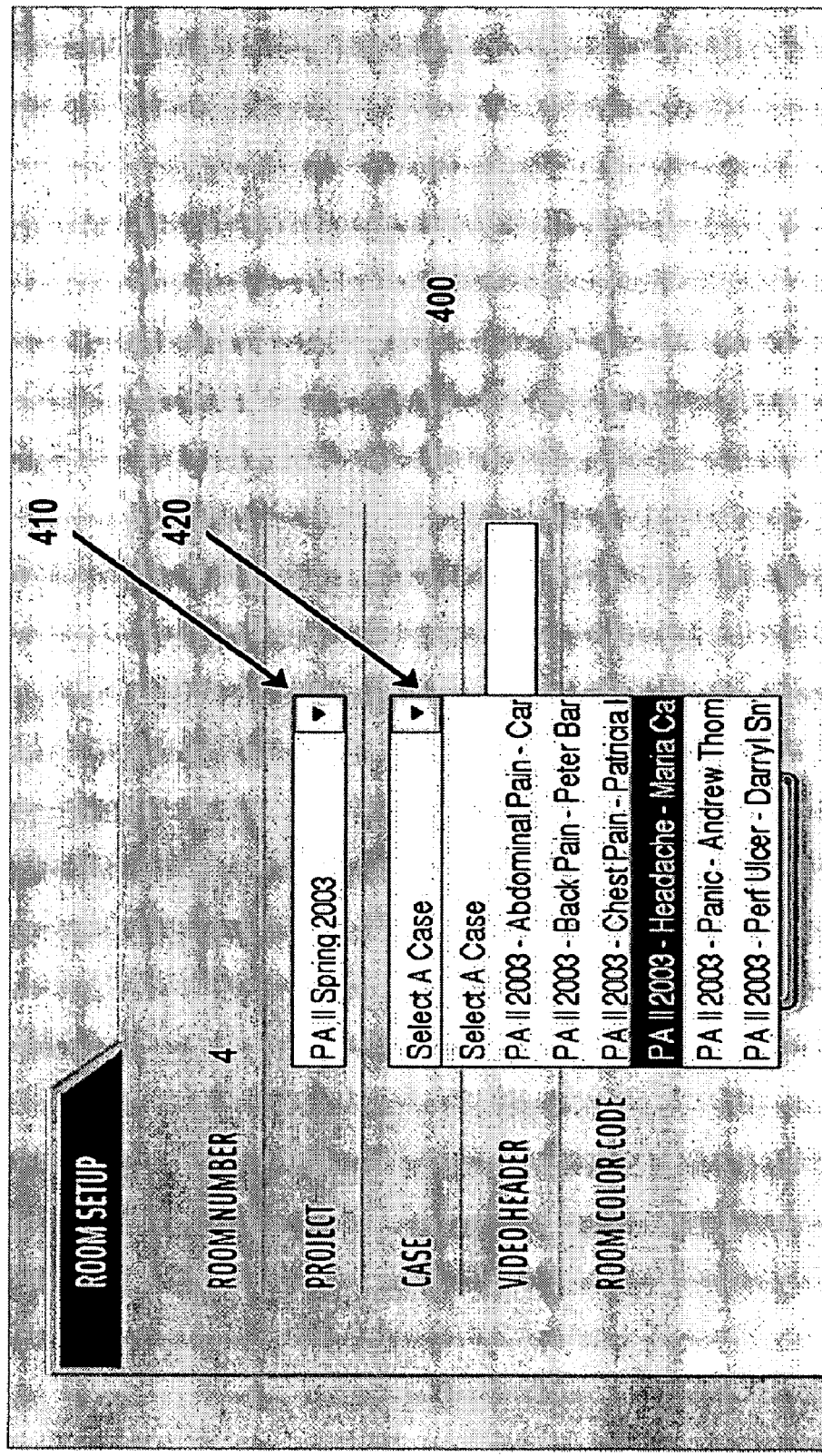
FIG. 4 is an exemplary room setup window according to the preferred embodiment of the present invention.

Once a station 120 has been selected in step 302, the GUI 214 preferably displays a room setup window. An exemplary room setup window 400 is illustrated in FIG. 4. As is shown, the room setup window 400 includes a project name field 410, and a case type field 420. The project name 410 and case type 420 fields are preferably drop down menus that include project names and common case types. For example, the drop down menu for case type field 420 includes various ailments such as abdominal pain, back pain and chest pain.

Referring again to FIG. 3, in step 304, the administrator 216 selects values for the project name and the case type fields 410, 420. In step 306, the administrator 216 applies the selections to the station 120, and in response, the management module 204 of the skills assessment tool 200 automatically retrieves information pertaining to the case type from the configuration database 218 and associates it with the station (step 308). For example, the management module 204 will retrieve, for the specific case type, door notes, camera position presets, post encounter assessments, and any other information relevant to the case type, and associate that information with the station 120. Once this step is completed, the station 120 is configured and the operations module 202 will indicate that the station 120 is ready for a testing (step 310). For example, the input/output devices for the student 124 and SP 122 display an indication that the assessment tool 200 is ready and that an encounter can now begin. If the administrator 216 wishes to configure another station (step 312), the administrator 216 simply selects another station (step 302) and process steps 304 through 310 are repeated.

The above-described configuration process significantly reduces the time required to configure the assessment stations 120 because the tool 200 allows the administrator 216 to configure a station 120 by merely selecting the project name and case type. The tool 200, as opposed to the administrator 216, automatically retrieves the appropriate pre-encounter information, post encounter assessments and other information related to a case type, and associates that information with the station 120. Moreover, changing the configuration for a station 120 is equally simple, i.e., the administrator 216 simply selects a different project name or case type.

Test Day Operations

Once the administrator 216 has configured the desired stations 120 for the testing session, the testing can commence. Preferably, information related to students 110, SPs 112 and evaluators 228 (collectively referred to as "test participants" or "participants"), has been uploaded and stored in the assessment database 219 prior to the testing session. Similarly, all information related to case type is also uploaded and stored in the configuration database 218 prior to the testing session. The uploading can be implemented automatically in a batch file, via an Excel spreadsheet, flat text file, an XML or web service, for example, or individually by participant, or manually.

Figure 5:
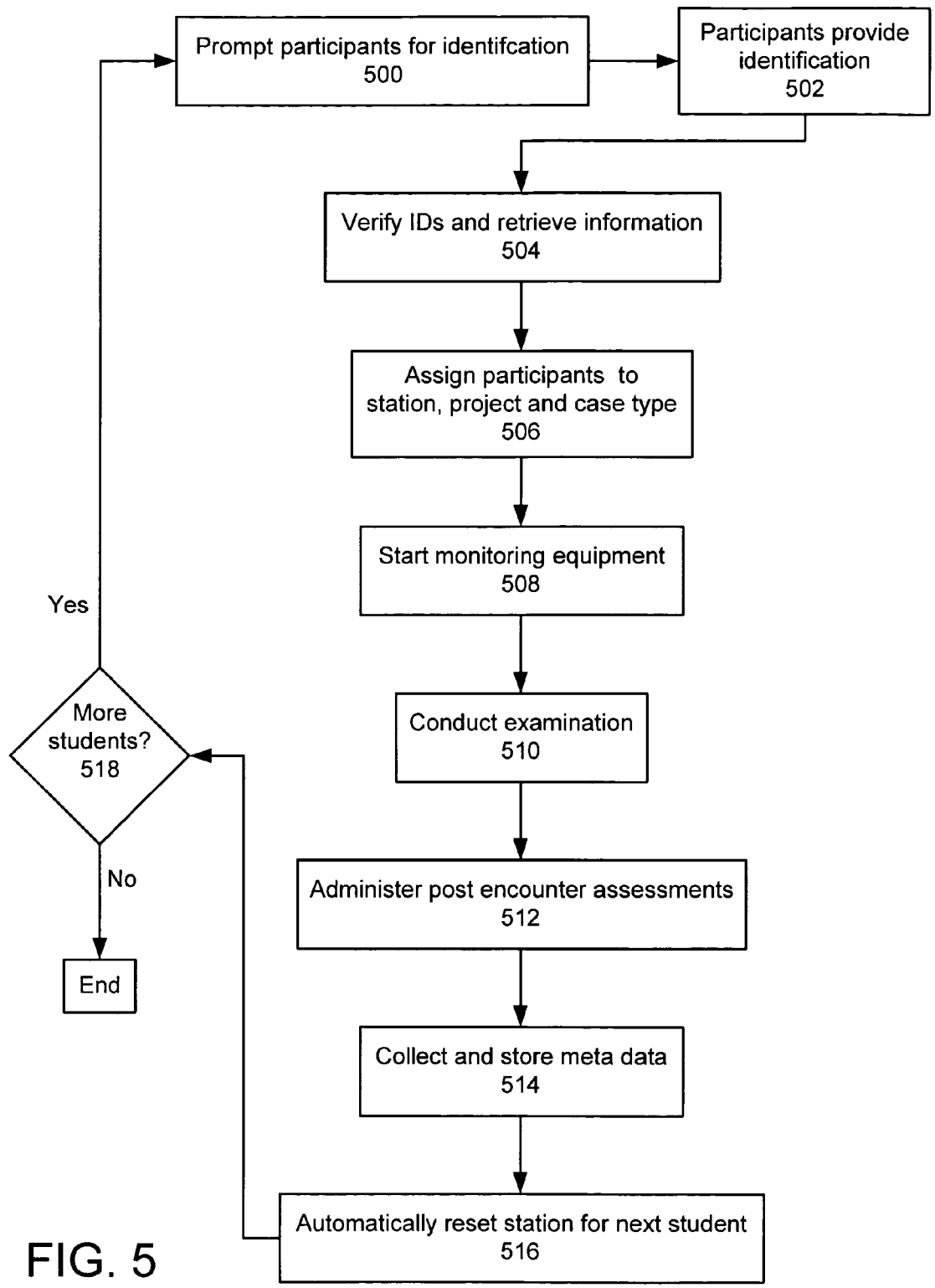
FIG. 5 is a flowchart illustrating a process for testing skills at one assessment station according to a preferred embodiment of the present invention.

FIG. 5 is a flowchart illustrating a process for testing skills at one assessment station according to a preferred embodiment of the present invention. Referring to FIGS. 2, 2A and 5, the testing process begins when the assessment tool 200 prompts the test participants, e.g., the student 110 and SP 112, for identification in step 500 via their respective input/output devices 122, 124. If an evaluator 228 is present, the evaluator input/output device 135 will also display such a prompt. In a preferred embodiment, the participant is prompted to enter a username and password associated with the participant. Preferably, if the station 120 has not been configured or if the tool 200 is otherwise unprepared for testing, the input/output devices will not prompt the participant for identification. Instead, they will indicate that the station 120 is not ready.

In step 502, the participants log-in to the tool 200 by entering identifying information, e.g., username and password, via the input/output devices 122, 124, 135. In an alternative embodiment, such electronic identification information can be transmitted through a barcode, e.g., scanning or swiping a card, or through some other form of transmission, e.g., infrared signals. In response to receiving the identification information, the assessment tool 200 verifies the identities of the participants and retrieves information related to the participants via the management module 204 (step 504). Thereafter, the participants are automatically assigned to the station 120, project name 410 and case type 420 via the operations module 202 in step 506.

After the assessment tool 200 receives the participants' identification and associates the participants with the station 120, the student 110 is prompted to begin the encounter by clicking a "start recording" button, for example. In response, the assessment tool 200 automatically starts the monitoring equipment 126 (step 508), e.g., timer and audio and visual recording equipment, via a recording control module 202a in the operations module 202. Preferably, the recording control module 202a interfaces with the monitoring equipment 126 to start and stop the recording, and specifies a directory and filename for the recorded asset. Accordingly, the recorded asset is automatically associated with the encounter, the student 110, SP 112, and any other related parties. In step 510, the student 110 conducts the examination of the SP 112.

During the encounter, the student and SP input/output devices 122, 124 display the time remaining for the encounter. In addition, the evaluator 228 is able to observe the student's performance through the evaluator input/output device 135. The operations module 202 preferably displays to the evaluator 228 a live encounter questionnaire to be completed during the encounter. In a preferred embodiment, the evaluator input/output device 135 includes an interface that allows the evaluator 228 to supply questions for the student 110 and/or SP 112, which are then incorporated into the post encounter assessments.

Once the student 110 indicates to the assessment tool 200 that the encounter has ended, by clicking a "Stop Encounter" button on the input/output device 124, for example, the recording control module 202a automatically turns off the monitoring equipment 126, and the operations module 202 then administers the post encounter assessments to the participants in step 512. Preferably, each participant is presented with the appropriate post encounter assessment corresponding to the case type via the participant's input/output device 122, 124, 135. For example, the post encounter assessment for the student 110 is typically a series of questions and a checklist of possible answers that are tailored to the particular case presented in the examination room 120. The post encounter assessment can also require the student 110 to write SOAP notes or essays.

Each post encounter assessment is automatically associated with the testing session, assessment station 120, the project name and the case type, and the participants. Accordingly, the participants can concentrate on completing their respective assessments and need not worry about remembering other miscellaneous facts pertaining to the encounter, e.g., the project name or the student's name, etc. Moreover, because the appropriate post encounter assessments were automatically assigned to the station 120 during the configuration stage, there is no need for each participant to perform an extra step of searching for the appropriate assessment.

After the participants have completed their respective assessments, the operations module 202 collects the responses and bundles them with the other meta information associated with the encounter, e.g., the recorded data, participant names, project name and case, and stores that information in the assessment database 219 in step 514. Optionally, the operations module 202 can indicate to the student 110 that a follow-up interview with the SP 112 is required and direct the student 110 to re-enter the station 120. The follow-up encounter is automatically recorded, as described above, and post follow-up encounter assessments can be administered.

Once the encounter (and optionally the follow-up encounter) has been completed, the operations module 202 automatically logs the student 110 out and resets for the next student 110 in step 516. Resetting the station 120 includes, for example, resetting the monitoring equipment 126 and clearing out the previous students' information in the student input/output device 124. The configuration of the station 120 remains persistent unless the administrator 216 wishes to reconfigure it. If another student 110 is to be tested in the station 120 (step 518), then steps 500 through 516 are repeated. The above-described testing process is implemented independently for all of the assessment stations 120 in the testing center 100.

One clear improvement that the present invention offers is that the tool 200, as opposed to the administrator 216, handles the assignment process. The assessment tool 200 is highly adaptive in that the tool 200 assigns the participants to a particular station 120 at the commencement of an encounter, as opposed to pre-scheduling the participants for a time slot. Accordingly, the participants are not associated with a station until the actual encounter. This allows students 110 to move to different stations 120 and SPs 112 to swap assignments on-the-fly without reconfiguring any of the stations 120.

Another advantage offered is that the tool 200, as opposed to the administrator 216, controls the recording process, as well as the administration of the post encounter assessments. In essence, the administrator 216 is not required to take an active role in any of the encounters during the testing session. Rather the administrator 216 can concentrate on ensuring the smooth implementation of the testing session.

In addition, what once was a manual and labor intense process is now completely automated by the tool 200. Notably, the tool 200 monitors every aspect of the encounter and, based on the status of the encounter, displays appropriate data to each of the participants on their respective input/output devices automatically. For example, in response to the student 110 logging into the tool 200 (step 502), the tool 200 displays to the SP 122 that the student 110 has logged in and is preparing to enter the station 120 for the encounter; displays to the student an honor code, followed by pre-encounter information, e.g., door notes and medical history, and then a prompt to begin the encounter; displays to the evaluator 228 the checklist associated with the student 110; and displays to the administrator 216 the station 120, the identities of the participants, and the case type—simultaneously.

Evaluating, Reporting and Communicating the Test Results

Figure 6:
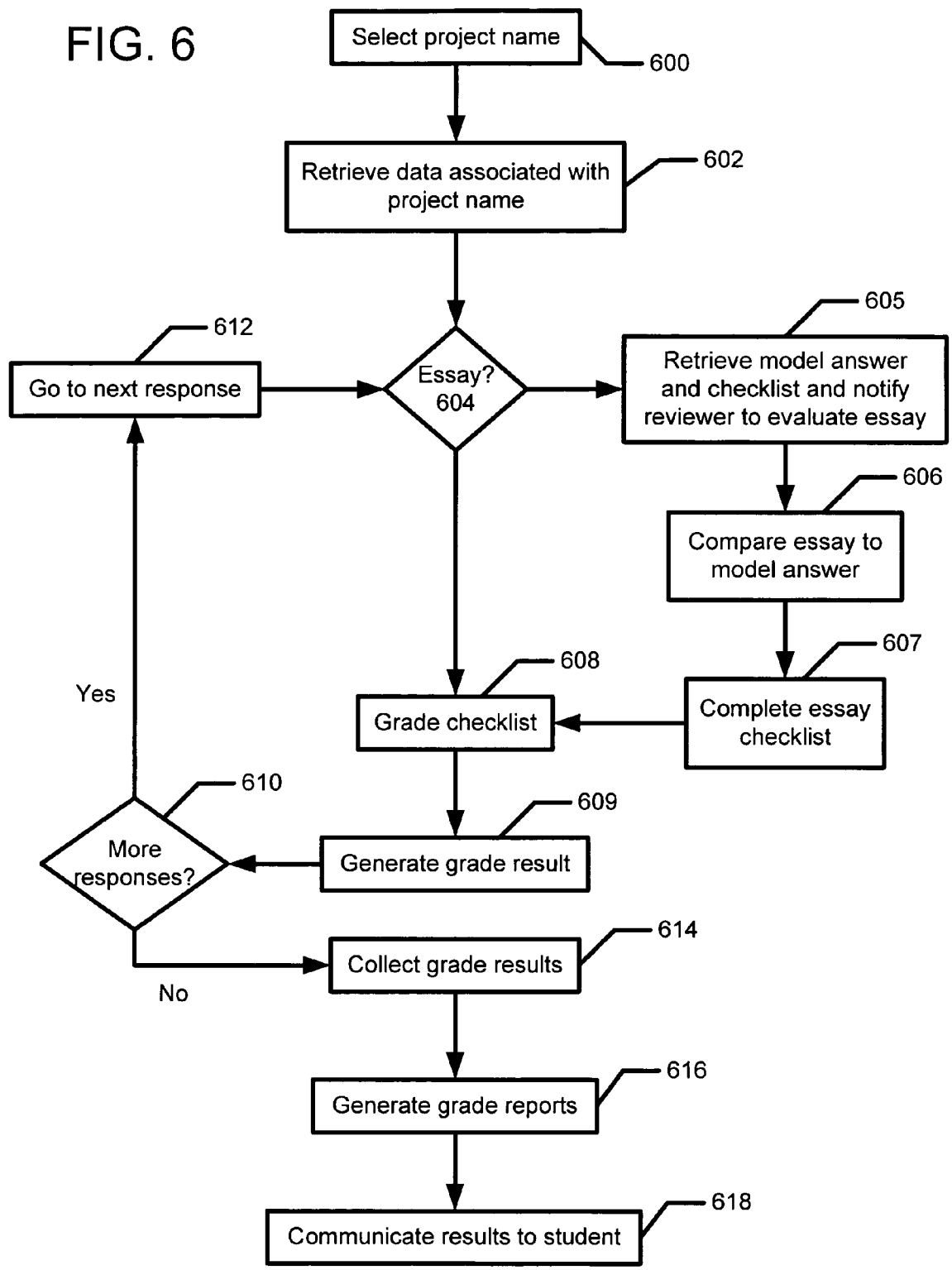
FIG. 6 is a flowchart illustrating a process for evaluating assessments according to a preferred embodiment of the present invention.

Once the testing session is completed, the assessment tool 200 allows the administrator 216, or any other authorized person, such as a faculty member, to evaluate the assessments for a student 110, or a class. FIG. 6 is a flowchart illustrating a process for evaluating assessments according to a preferred embodiment of the present invention. In step 600, the administrator 216 or faculty member, selects a grading mode and selects a project name that identifies a particular testing session. In response, the reporting module 206 in the assessment tool 200 automatically retrieves the data associated with the testing session from the assessment database 219 in step 602, including the ungraded responses to the post encounter assessments. For each response, the reporting module 206 determines whether the response is an essay (step 604). If the response is not an essay, i.e., it is a checklist, the reporting module 206 automatically grades the checklist (step 608) and generates a grade result in step 609.

While grading the checklist is relatively straightforward and objective, grading an essay is more complicated and vulnerable to the subjectivities of the evaluator(s). The assessment tool 200 addresses this issue. If the response is an essay (step 604), the reporting module 206 retrieves a "golden standard" or "model answer" and an essay checklist associated with the model answer in step 605. In a preferred embodiment, the model answer is provided by the faculty member before the testing session along with the essay checklist used to evaluate the student's response in light of the model answer. Both are affiliated with the case type and stored in the configuration database 218.

The tool 200 also automatically notifies a reviewer assigned to evaluate the essay that the essay is ready to be graded in step 605. When the reviewer logs in, the tool 200 automatically displays to the reviewer the essay, the model answer and the essay checklist. The reviewer compares the student's essay to the model answer in step 606 and then completes the essay checklist (step 607) corresponding to how closely the student's essay tracks the model answer. By having the reviewer complete the essay checklist, the subjectivity of the reviewer is minimized. Moreover, because the grading is based on a model answer and essay checklist, the reviewer need not necessarily be a faculty member. Rather, the reviewer can be a trained staff person or teaching assistant. Once the essay checklist is completed, it is then returned to the reporting module 206, which grades the checklist in step 608 and generates a grade result in step 609.

If more responses need to be graded (step 610), the reporting module 206 acquires the next response (step 612) and repeats process steps 604 through 609. After the reporting module 206 has generated the grade result for all of the responses in the testing session, the grade results are collected in step 614 and grade reports are generated in step 616. The grade reports can be run to calculate the mean grade result and standard deviation by case, by SP 112, by student 110 or by question, for example. The grade reports preferably summarize the grade results for the students 110 and are used by faculty to evaluate a student's performance and to compare each student's performance against his or her classmates.

FIGS. 7A and 7B are diagrams illustrating sample grade reports. In FIG. 7A, a report can list students 110 by grade result for a particular case, e.g., chest pain. In FIG. 7B, a summary of the grade results is presented for a particular student 110, and trouble areas are highlighted for ready identification. These reports can be utilized by faculty to identify students 110 who are having difficulty with their clinical skills or to identify questions in the tests that may be problematic. Problematic questions can be easily revised because the tests are database-driven. All grading data related to the testing session, e.g., test scores and reports, are stored in the assessment database 219 for future use.

The assessment tool 200 allows a faculty member to access these grade reports, as well as any other information related to the testing session, e.g., recorded assets stored in the assessment database 219. In a preferred embodiment, a dynamic data access module 204a in the management module 204 allows the faculty member or student 110 to download specific exam results into an access database. Moreover, a digital archive access module 204b controls access to the recorded encounters, i.e., digital assets, stored in the assessment database 219.

Referring again to FIG. 6, once the faculty member(s) has reviewed the grade reports and other related information, the reporting module 206 communicates the grade results to each student 110 in step 618. In a preferred embodiment, the reporting module 206 generates a personalized letter to the student 110 providing the student's test results, specifying areas of strength and weakness, and notifying the student 110 to consult with faculty for remediation. In another embodiment, the reporting module 206 transmits an electronic message to the student 110 containing the same information.

In the above described embodiment of the present invention, each assessment station 120 includes a student input/output device 124, which is preferably located at the entrance to the assessment station 120 (see FIG. 1). In another preferred embodiment, the student input/output device 124 is a mobile device that is carried by the student 110 from station 120 to station 120.

Figure 8:
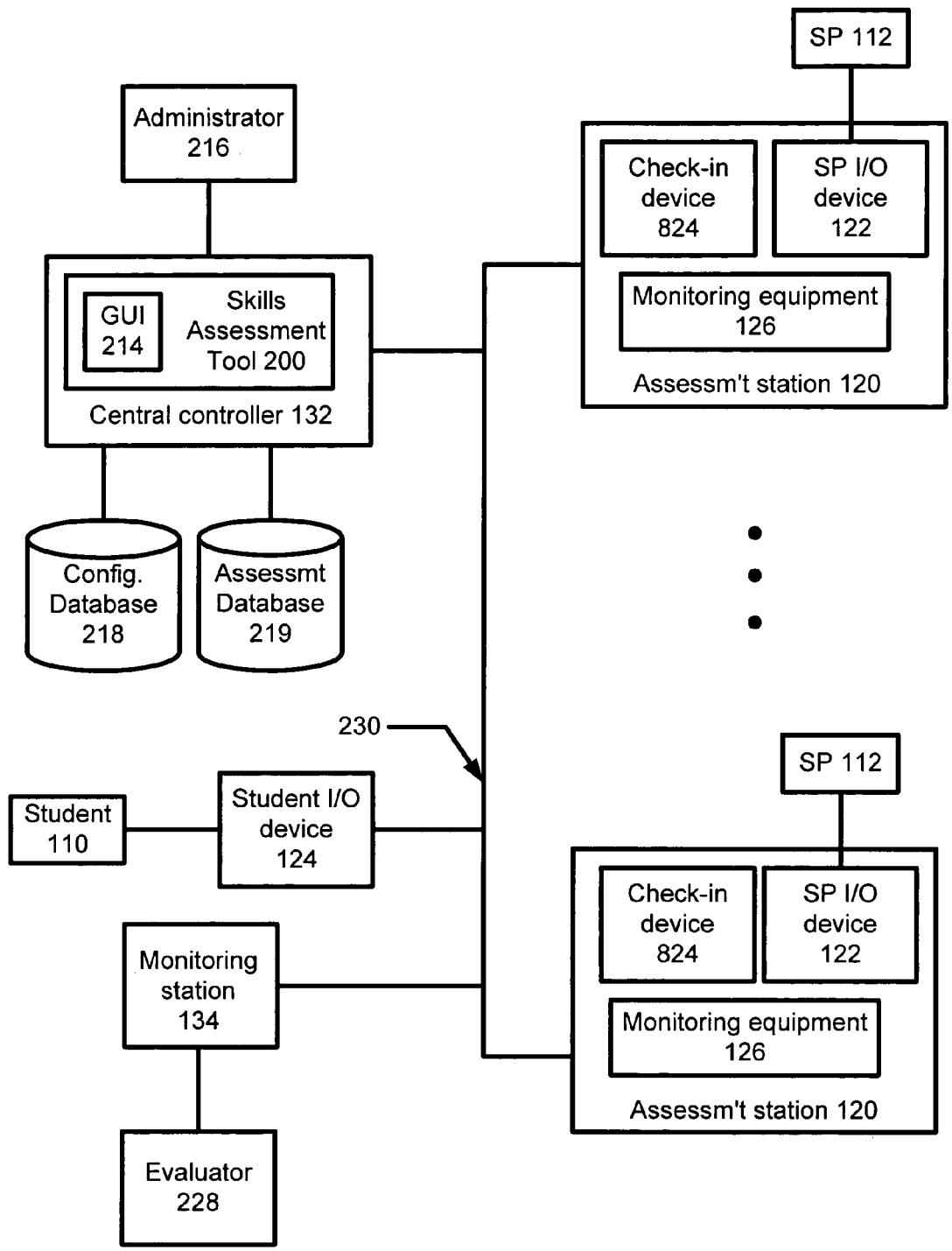
FIG. 8 is a block diagram illustrating the management system according to the second embodiment of the present invention.

FIG. 8 is a block diagram illustrating the management system according to the second embodiment of the present invention, where like components from FIG. 2 are designated by like reference numerals. In this embodiment, the student input/output device 124 is associated with the student 110, as opposed to the station 120, and is preferably a mobile device that is easily carried by the student 110.

Each station 120 is equipped with a check-in device 824 that is used to automatically identify the student 110 to the assessment tool 200 during the testing session. The check-in device 824 is preferably a device that can read a barcode on a card when the student 110 swipes or presents the card through the device 824. The device 824 can also include a receiver for automatically receiving a transmitted signal from the student input/output device 124 or from a signal emitting device (not shown) carried by or attached to the student 110.

Once the assessment tool 200 receives the electronic identification from the check-in device 824 at a station 120, the tool 200 identifies the student 110 and automatically determines his or her location, i.e., station 120. The tool 200 then assigns the student 110 to the station 120 and transmits all the necessary information pertaining to the station 120, project name, and case type to the student's input/output device 124.

Through aspects of the method and system of the present invention, managing a skills assessment center is highly automated and the testing process is significantly improved. For example:

Station configuration is more efficient because the management module 204 automatically retrieves and associates the appropriate checklists and information to the station 120 in response to the administrator 216 selecting a project name and case type.

The assignment process is simplified because the tool 200 assigns the encounter participants to a station 120 when the participants identify themselves at the station 120.

The assignment process is more flexible because participants are not pre-assigned to a station 120 for a specific time slot and day, as is the usual practice, and assignment changes can be implemented on-the-fly.

Test monitoring is automated and controlled by the tool 200. The tool 200 essentially acts as a virtual proctor—it records the examination, displays appropriate data to the participants during the encounter, administers the post encounter assessments, and resets the station. Accordingly, an entire testing session involving multiple students 110 testing in multiple stations 120 can be managed single handedly.

Test participants require little training to use the assessment tool 200 because the tool 200 is highly automated and intuitive. For example, the tool 200 automatically displays simple instructions to the participants via the input/output devices, and, for each station 120, associates the participant names, project name and case type, testing session and respective post encounter assessments. In this manner, the participants are not required to navigate complicated menus to find information. Rather they can focus on the encounter and not on the automated system.

Because the system is network-based, the control center 130 can be located on site, e.g., at the same location as the assessment stations 120, or at another site. Accordingly, one control center 130 can manage several local and remote testing centers, and data can be stored centrally.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a testing session in a clinical skills testing center comprising a plurality of assessment stations, wherein each of the plurality of assessment stations includes an input/output device and monitoring equipment, the method comprising:

a) prior to the beginning of the testing session, configuring the plurality of assessment stations by associating each of the assessment stations with a case type;

b) during the testing session, receiving electronic identification of a student at one of a plurality of assessment stations prior to the student commencing an encounter at the one assessment station;

c) in response to receiving the student's identification, automatically assigning the student to the one assessment station for the encounter, wherein the encounter corresponds with the case type associated with the one assessment station;

d) prompting the student to begin the encounter at the one assessment station via the input/output device associated with the one assessment station to record the encounter; and e) in response to the student beginning the encounter, automatically starting the monitoring equipment associated with the one assessment station;

f) utilizing the monitoring equipment to time and record the encounter;

g) storing the recorded encounter in a database, wherein the recorded encounter is automatically associated with at least the testing session and the student; and h) repeating steps (b) through (g) for the student at another of the plurality of assessment stations to enable the student to perform another encounter with a different case type.

2. The method of claim 1, wherein the student provides the identification via the input/output device associated with the one assessment station.

3. The method of claim 2 further comprising:
in response to receiving the student's identification, automatically displaying on the input/output device pre-encounter information related to the case type associated with the assessment station.

4. The method of claim 1 further comprising:
prior to configuring step (a), automatically uploading data related to each of a plurality of test participants and data associated with a plurality of case types; and
storing the uploaded data in a database.

5. The method of claim 4, wherein the configuring step (a) further comprises:
(a1) displaying a list of the plurality of assessment stations;
(a2) allowing a user to choose an assessment station from the list;
(a3) allowing the user to select the case type to be associated with the chosen assessment station;
(a4) in response to receiving the user's selected the case type, automatically retrieving the data associated with the selected case type from the database;
(a5) automatically associating the retrieved data with the chosen assessment station; and
(a6) repeating steps (a1) through (a5) until each of the assessment stations has been configured.

6. The method of claim 1 wherein step (g) further comprises:
after the student has ended the encounter, automatically administering a post encounter assessment to the student via the input/output device, wherein the post encounter assessment is related to the case type associated with the one assessment station.

7. The method of claim 6 further comprising:
after the student has completed the post encounter assessment, automatically resetting the one assessment station; and
repeating steps (b) through (h) for another student.

8. The method of claim 6 further comprising:
after the student has completed a response to the post encounter assessment, storing the response in a database, wherein the response is automatically associated with the testing session, the student, the one assessment station and the case type; and
repeating steps (b) through (g) for the student at the others of the plurality of assessment stations until the student has completed the testing session.

9. The method of claim 8 further comprising:
after the testing session, evaluating the student's responses to the post encounter assessments; and
automatically generating a grade report summarizing the student's performance.

10. The method of claim 9 further comprising:
automatically communicating the grade report to the student.

11. A non-transitory computer readable medium containing program instructions for managing a testing session in a clinical skills testing center comprising a plurality of assessment stations, wherein each of the plurality of assessment stations includes an input/output device and monitoring equipment, the computer readable medium comprising the program instructions for:

a) prior to the beginning of the testing session, configuring the plurality of assessment stations by associating each of the assessment stations with a case type;

b) during the testing session, receiving electronic identification of a student at one of a plurality of assessment stations prior to the student commencing an encounter at the one assessment station;

c) in response to receiving the student's identification, automatically assigning the student to the one assessment station for the encounter, wherein the encounter corresponds with the case type associated with the one assessment station;

d) prompting the student to begin the encounter at the one assessment station via the input/output device associated with the one assessment station to record the encounter; and e) in response to the student beginning the encounter, automatically starting the monitoring equipment associated with the one assessment station;

f) utilizing the monitoring equipment to time and record the encounter;

g) storing the recorded encounter in a database, wherein the recorded encounter is automatically associated with at least the testing session and the student; and h) repeating steps (b) through (g) for the student at another of the plurality of assessment stations to enable the student to perform another encounter with a different case type.

12. The computer readable medium of claim 11, wherein the student provides the identification via the input/output device associated with the one assessment station.

13. The computer readable medium of claim 12 further comprising instructions for:
in response to receiving the student's identification, automatically displaying on the input/output device pre-encounter information related to the case type associated with the assessment station.

14. The computer readable medium of claim 11 further comprising:
prior to configuring step (a), automatically uploading data related to each of a plurality of test participants and data associated with a plurality of case types; and
storing the uploaded data in a database.

15. The computer readable medium of claim 14, wherein the configuring instruction (a) further comprises:
(a1) displaying a list of the plurality of assessment stations;
(a2) allowing a user to choose an assessment station from the list;

(a3) allowing the user to select the case type to be associated with the chosen assessment station;

(a4) in response to receiving the user's selected the case type, automatically retrieving the data associated with the selected case type from the database;

(a5) automatically associating the retrieved data with the chosen assessment station; and (a6) repeating steps (a1) through (a5) until each of the assessment stations has been configured.

16. The computer readable medium of claim 11 wherein step (g) further comprises:

after the student has ended the encounter, automatically administering a post encounter assessment to the student via the input/output device, wherein the post encounter assessment is related to the case type associated with the one assessment station.

17. The computer readable medium of claim 16 further comprising:

after the student has completed the post encounter assessment, automatically resetting the one assessment station; and repeating instructions (b) through (h) for another student.

18. The computer readable medium of claim 16 further comprising:

after the student has completed a response to the post encounter assessment, storing the response in a database, wherein the response is automatically associated with the testing session, the student, the one assessment station and the case type; and repeating instructions (b) through (g) for the student at the other of the plurality of assessment stations until the student has completed the testing session.

19. The computer readable medium of claim 18 further comprising:

after the testing session, evaluating the student's responses to the post encounter assessments; and automatically generating a grade report summarizing the student's performance.

20. The computer readable medium of claim 19 further comprising:

automatically communicating the grade report to the student.

21. A skills assessment center comprising:

a plurality of assessment stations, wherein each of the plurality of assessment stations includes an input/output devices for interacting with a plurality of students, and monitoring equipment;

a central controller coupled to the plurality of input/output devices and to the monitoring equipment in each of plurality of assessment stations; and a skills assessment tool executed by the central controller, wherein the skills assessment tool is functional for:

a) prior to the beginning of the testing session, allowing an administrator via a user interface to configure the plurality of assessment stations by associating each of the assessment stations with a case type;

b) during the testing session, receiving electronic identification of one of the students at one of a plurality of assessment stations prior to the student commencing an encounter at the one assessment station;

c) in response to receiving the student's identification, automatically assigning the student to the one assessment station for the encounter, wherein the encounter corresponds with the case type associated with the one assessment station;

d) prompting the student to begin the encounter at the one assessment station via the input/output device associated with the one assessment station to record the encounter; and e) in response to the student beginning the encounter, automatically starting the monitoring equipment associated with the one assessment station;

f) utilizing the monitoring equipment to time and record the encounter;

g) storing the recorded encounter in a database, wherein the recorded encounter is automatically associated with at least the testing session and the student; and h) repeating steps (b) through (g) for the student at another of the plurality of assessment stations to enable the student to perform another encounter with a different case type.

22. The skills assessment center of claim 21 further comprising a check-in device in each of the plurality of assessment stations, wherein the check-in device is in communication with the central controller and is configured to receive and transmit the student's identification to the skills assessment tool.

23. The skills assessment center of claim 21 further comprising:

means for uploading data related to the plurality of case types and data related to the plurality of students; and for storing the uploaded data in the database.

24. The skills assessment center of claim 23, wherein, via the user interface, the skills assessment tool displays a list of the plurality of assessment stations to the administrator, allows the administrator to choose an assessment station from the list, and allows the administrator to select the case type to be associated with the chosen assessment station.

25. The skills assessment center of claim 24, wherein the skills assessment tool further comprises means for automatically retrieving the data related to the selected case type from the database and means for automatically associating the retrieved data with the chosen assessment station.

26. The skills assessment center of claim 21 wherein one of the plurality of input/output devices is associated with the student and the skills assessment tool further administers a post encounter assessment to the student via the input/output device after the student has ended the encounter.

27. The skills assessment center of claim 21 wherein each of the plurality of input/output devices is associated with an assessment station and the skills assessment tool further administers a post encounter assessment to the student via the input/output device after the student has ended the encounter.

28. The skills assessment center of claim 27 wherein the skills assessment tool resets the assessment station for another encounter after the student has completed a response to the post encounter assessment.

29. The skills assessment center of claim 28 wherein the skills assessment tool evaluates the student's response to the post encounter assessment, generates a grade report summarizes the student's performance, and communicates the grade report to the student.

30. A skills assessment tool for managing a testing session in a clinical skills testing center comprising a plurality of assessment stations, comprising:

means for uploading data related to a plurality of students and data associated with a plurality of case types;

a user interface for enabling an administrator to associate each of the plurality of stations with a case type from the plurality of case types prior to the beginning of the testing session;

means for automatically retrieving and associating the data associated with the case type to the assessment station;

means for prompting a student of the plurality of students to provide identification at an assessment station prior to the student commencing an encounter at the assessment station during the testing session;

means for receiving the student identification;

means, responsive to receiving the student identification, for automatically assigning the student to the assessment station for the encounter;

means for automatically controlling monitoring equipment associated with each of the plurality of assessment stations for monitoring and recording the encounter at the assessment station;

means for administering a post encounter assessment to the student via an input/output device after the student has completed the encounter;

means for resetting the assessment station for another encounter after the student has completed a response to the post encounter assessment;

means for grading the student's response to the post encounter assessment, generating a grade report summarizing the student's performance, and communicating the grade report to the student; and means for automatically associating the recorded encounter with the student, the case type and the assessment station and for storing the recorded encounter in a database.

31. A method for managing a testing session in a medical clinical skills testing center comprising a plurality of assessment stations, the method comprising:
    (a) associating each of the plurality of assessment stations with a case type from a plurality of case types prior to the beginning of the testing session;
    (b) during the testing session, automatically assigning a student and a standard patient (SP) for which the student is to medically diagnose to one of the plurality of assessment stations after the student and the SP provide identification at the one station;
    (c) automatically recording the testing session using audio and visual recording equipment in the one station; and
    (d) storing the recording of the testing session as one or more files and associating the one or more files with the student, the SP, and the testing session.

32. A skills assessment tool for managing a testing session in a medical skills testing center, the center comprising a plurality of assessment stations, wherein each of the plurality of assessment stations includes a student input/output device, a patient input/output device and monitoring equipment, the assessment tool comprising:

means for communicating with each of the plurality of assessment stations;

a user interface for enabling a test proctor to associate each of the plurality of stations with a case type from a plurality of case types prior to the beginning of the testing session;

means for automatically retrieving and associating data related to the case type to the assessment station, wherein the data related to the case type includes door notes, medical history, post encounter assessments for a student and a patient, and evaluation materials;

a patient interface for allowing a patient to provide identification via the patient input/output device at an assessment station prior to the beginning of the testing session;

a student interface for prompting a student to provide identification via the student input/output device at an assessment station prior to the student commencing an encounter with the patient at the assessment station during the testing session;

means for receiving the student identification;

means, responsive to receiving the student identification, for automatically associating the student, the patient and the case type to the assessment station for the encounter;

means for automatically controlling the monitoring equipment associated with the assessment station for monitoring and recording the encounter at the assessment station; and means for automatically associating the recorded encounter with the student, the patient, the case type and the assessment station and for storing the recorded encounter in a database.

33. The skills assessment tool of claim 32 further including:

means for automatically administering a post encounter assessment to the student via the student input/output device after the student has completed the encounter; and means for automatically administering a post encounter assessment to the patient via the patient input/output device after the student has completed the encounter.

34. The skills assessment tool of claim 33 further comprising:

means for automatically associating post encounter assessments completed by the student and the patient with the student, the patient, the case type, the assessment station and the testing session; and means for evaluating the completed post encounter assessments, automatically generating a grade report summarizing the student's performance, and automatically communicating the grade report to the student.

* * * * *